United States Patent [19]

Araki et al.

[11] Patent Number: 4,656,462

[45] Date of Patent: Apr. 7, 1987

[54] OBJECT DETECTING APPARATUS INCLUDING PHOTOSENSORS FOR RESTRICTED DETECTION AREA

[75] Inventors: Tsunehiko Araki, Takarazuka; Hiroshi Matsuda, Shijonawate; Kazuhito Kayanoki, Tsu; Akira Nagaoka, Hirakata, all of Japan

[73] Assignee: Matsushita Electric Works, Ltd., Osaka, Japan

[21] Appl. No.: 723,060

[22] Filed: Apr. 15, 1985

[30] Foreign Application Priority Data

Apr. 25, 1984 [JP] Japan .................................. 59-83143
Oct. 12, 1984 [JP] Japan ................................ 59-213408

[51] Int. Cl.$^4$ ............................................. G08B 13/18
[52] U.S. Cl. ..................................... 340/556; 340/529; 340/557
[58] Field of Search ......................... 340/556, 557, 529

[56] References Cited

U.S. PATENT DOCUMENTS

| 3,727,207 | 4/1973 | Missio et al. .......................... 340/557 |
| 3,752,978 | 8/1973 | Kahl, Jr. et al. ...................... 340/556 |
| 4,068,222 | 1/1978 | Treviranus ............................. 340/556 |
| 4,103,285 | 7/1978 | Lloyd et al. ........................... 340/529 |
| 4,310,756 | 1/1982 | Sick et al. ............................. 340/556 |

FOREIGN PATENT DOCUMENTS 2014681 7/1971 Fed. Rep. of Germany .
120875 7/1982 Japan .

Primary Examiner—Glen R. Swann, III
Attorney, Agent, or Firm—Burns, Doane, Swecker & Mathis

[57] ABSTRACT

An object detecting apparatus has a plurality of light emitters which are sequentially actuated for projecting sequential light beams. A first structure is provided for receiving beams not reflected off any external body. A second structure is provided for receiving any part of the light beams reflected from an object in the area. A reference phase signal corresponding to the projected light beams is generated. A detection phase signal corresponding to the received reflected beam is also generated. The light emitters corresponding to the reflected light beams are continuously activated. The detection area is restricted by inhibition of output from an alarm phase difference discriminating circuit to a circuit when a difference between the reference and detection phases is not within a predetermined range. Consequently, the detection area can be restricted to a desired range, and the alarm circuit can be retained non-operative unless the object remains continuously in the area. This avoids any malfunction produced by any transitory object, while the actuation of the light projecting means in a very short time sequence accelerates the detecting operation with minimized power consumption.

8 Claims, 20 Drawing Figures

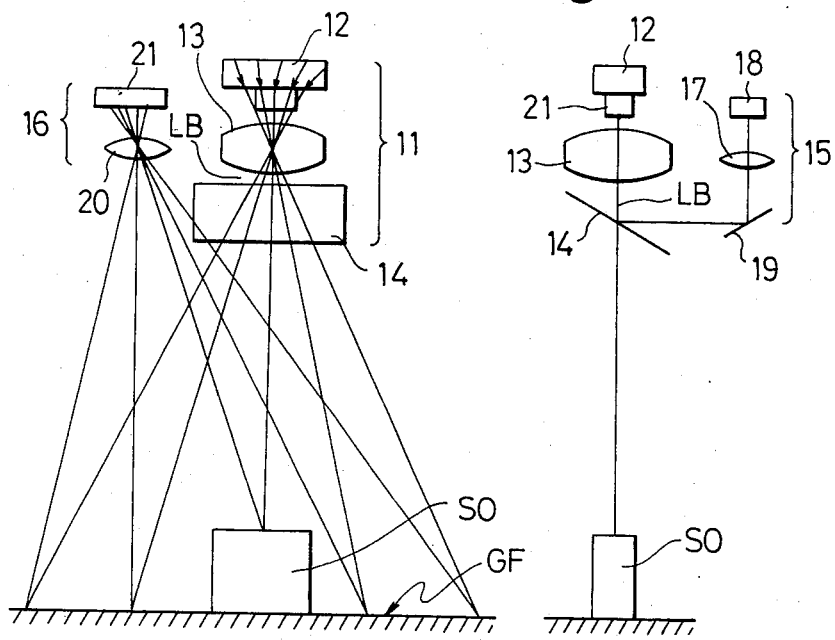
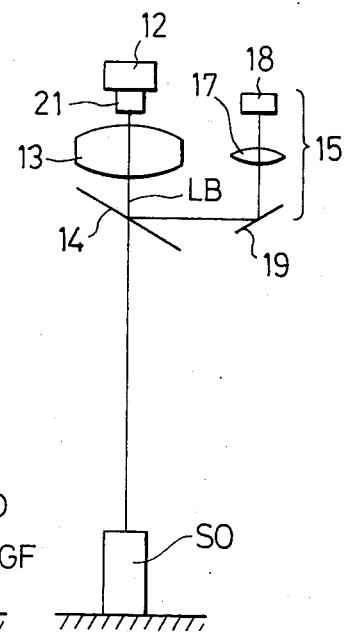
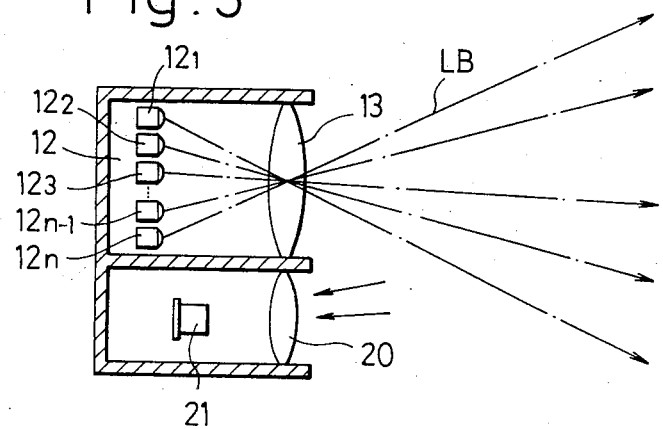

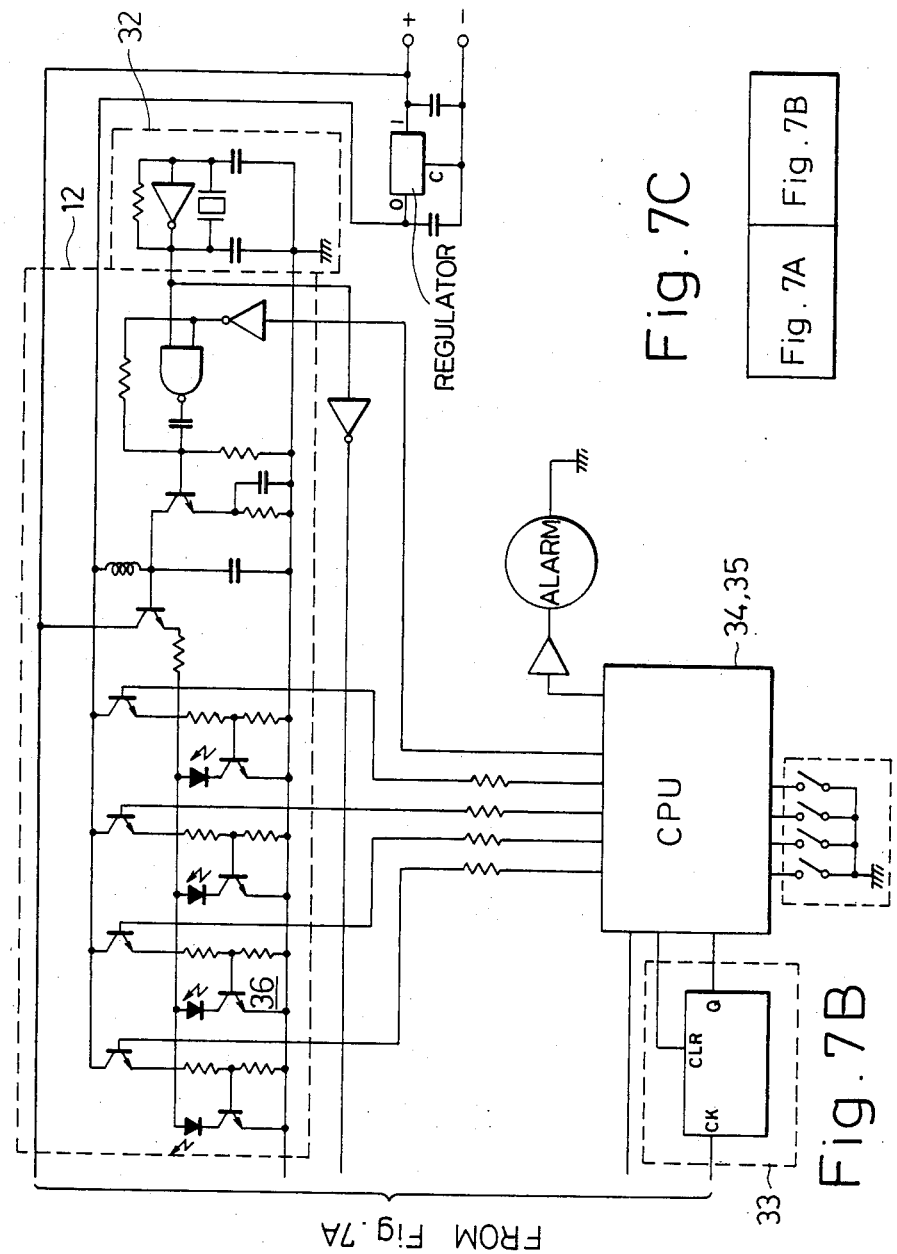

OBJECT DETECTING APPARATUS INCLUDING PHOTOSENSORS FOR RESTRICTED DETECTION AREA

TECHNICAL BACKGROUND OF THE INVENTION

This invention relates to an object detecting apparatus including photosensors which can set their detection area to be of a restricted range.

The object detecting apparatus of the type referred to is arranged so that a light projecting means emits a light beam or infrared beam so that, when an object exists in the path of the beam, the beam reflected to return from the object will be detected through a light receiving means to provide an alarm, and is effectively utilized specifically as a burglar alarm or the like.

DISCLOSURE OF PRIOR ART

A known intrusion detector which employs a photosensor has been suggested in, for example, U.S. Pat. No. 3,727,207 of Danilo V. Missio et al., which comprises means for transmitting a laser beam to a target fixed at an end of a desired detecting path of the beam, means for receiving the beam reflected from the target, means for converting received light to an electric current signal and amplifying the signal, and means for detecting the voltage level of the amplified signal and discriminating both transmission time and reception time of the laser beam on the basis of the detected voltage level, so that a presence of any trespasser in the path of the laser beam will be detected in the form of a reflection time of the trespasser on the basis of a reference reflection time with respect to the fixed target and an alarm will be thereby generated.

This known detector, however, has a problem that, though the intention is to detect a human trespasser, erroneous detection and alarming have been caused to occur even with any other object not intended, i.e., such a small animal as a dog, bird or the like, so long as it is present in the detection range defined by the beam path from the detector to the fixed target. Such malfunction tends to occur frequently in this type of object detecting apparatus to lower its reliability in respect of the alarming, and the apparatus has not been used widely as the burglar alarm.

Further disclosed in German Patent Application No. P2014681.0 of W. E. Nocke is a distance measuring apparatus which comprises means for projecting a modulated light beam, means for directly receiving the beam projected and not reflected by an object to be detected, means for receiving the beam reflected by the object, means for receiving an output of the direct beam receiving means to provide a reference phase, means for receiving an output of the reflected beam receiving means to provide a detection phase, and means for determining a difference between the reference and detection phases. With such an arrangement, a distance between the apparatus and the object can be obtained according to the magnitude of the phase difference. When the thus obtained result is utilized for detecting an intruding object and the mounting position of the distance measuring apparatus is optimumly taken into consideration, it is possible to omit a range expanding from the ground face to a height of the mounting position from the detecting area, whereby its erroneous operation responsive to a child or such a small animal as a dog or the like can be avoided.

In this case, however, there still arises such problem that an intrusion of such a small flying animal as a bird or the like into the path of the beam causes the apparatus to operate erroneously while an object that does not intersect the beam path which is single according to this known apparatus cannot be detected at all. Such malfunction with respect to the small flying bird or the like object may be avoided by setting the beam projecting time to be relatively long, that is, to be longer than the passing time of the transitory small object, and also prolonging the beam reception and detection time. As will be readily understood, on the other hand, there still arise further problems that power consumption required for the beam projection becomes large, and that a use of, for example, an inexpensive light emitting diode as the beam projecting element will result in a poor durability of the apparatus due to easy deterioration of the diode in a short time.

Further, there has been disclosed in Japanese Patent Appln. Laid-Open Publication No. 120875/82 of S. Tutumi et al. a detection technique wherein a light projecting means including a plurality of relatively inexpensive light emitting diodes projects simultaneously a plurality of light beams, and a light receiving means also having a plurality of light receiving diodes receives simultaneously reflected ones of the light beams with the receiving diodes corresponding to the emitting diodes of the reflected beams, so that a detection area corresponding to that of the projected light beams can be obtained. In this case, the detection area can be of a certain expansion but it is still impossible to restrict the practical detection to a specific range within the area. Yet, the projection of the light beams is continuous during the use, so that the power consumption will become large and the inexpensive light emitting diodes will be fast deteriorated.

TECHNICAL FIELD OF THE INVENTION

A primary object of the present invention is, therefore, to provide an object detecting apparatus which is capable of restricting its detection area to a desired range, eliminating any malfunction with respect to a small flying animal or the like, employing inexpensive light emitting elements as light projecting means for minimizing required power consumption, and still achieving a high reliability and excellent economization.

According to the present invention, the object can be realized by providing an object detecting apparatus for a restricted detection area, which comprises a plurality of light projecting means arranged for projecting respectively independently a light beam modulated in pulse to be of a burst wave, first means for directly receiving the light beams from the respective light projecting means not as reflected to return from the detection area, second means for receiving a reflected part of the light beams projected from the light projecting means and reflected to return from an reflecting object in the area, means for receiving an output of the first light receiving means to provide a reference phase for the light beams projected, means for receiving an output of the second light receiving means to provide a detection phase for the reflected light beams received, means for determining a difference between the reference and detection phases, and alarm means operated by an output of the phase difference determining means, wherein there are further provided a scanning means for sequentially actuating the plurality of light projecting means, means for continuously actuating only a part of the light projecting means which corresponds to the reflected and received part of the beams, and means for restraining the output of the phase difference determining means from being provided to the alarm means when the phase difference is of a level not within a predetermined range.

Other objects and advantages of the present invention shall become clear from the following description of the invention detailed with reference to preferred embodiments shown in accompanying drawings.

BRIEF EXPLANATION OF THE DRAWINGS

FIG. 1 shows schematically in a front elevation a relationship between the projection of the light beams and the reception of the reflected light beams by the light projecting means and second light receiving means in an embodiment of the present invention;

FIG. 2 shows also schematically in a side elevation a relationship between the light beam projection and the reception by the first light receiving means in the embodiment of FIG. 1;

FIG. 3 shows in detail to some extent an example of arrangement of the light projecting and receiving means in FIG. 1 which including light emitting elements and a light receiving element;

FIGS. 7A and 7B comprise a detailed circuit diagram of the processing means in FIGS. 6A and 6B;

FIG. 7C is an illustration of the relationship between FIGS. 7A and 7B;

Figure 4:
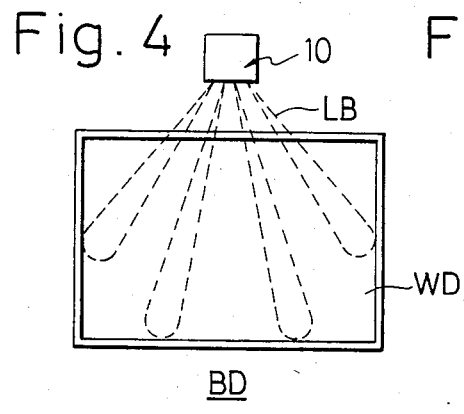
FIG. 4 shows in a front elevation a restricted detection area formed by the light projecting means of FIG. 1.

While the present invention shall now be described with reference to the preferred embodiments shown in the drawings, it should be understood that the intention is not to limit the invention only to the particular embodiments shown but rather to cover all alterations, modifications and equivalent arrangements possible within the scope of appended claims

DISCLOSURE OF PREFERRED EMBODIMENTS

Referring to FIGS. 1 and 2, there is shown an object detecting apparatus according to the present invention and vertically installed against the ground face GF, which apparatus comprises a light projecting means 11 which includes a light projecting array 12 of a plurality of light emitting diodes $12_1, \ldots,$ and $12_n$ arranged substantially in a row as shown, for example, in FIG. 3 to project beams of light pulse-modulated to be of a burst wave and respectively in different directions but lying in a single plane. Disposed in such optical path of the array 12 are a collimater lens 13 and a half mirror 14 tilted by a proper angle so that light beams LB emitted from the diodes of the array 12 will pass through the lens 13 and reach the mirror 14, where a part of the light beams LB is reflected by the mirror 14 to be directed toward first light receiving means 15, while the remainder beams are caused to pass through the mirror 14 and to be reflected by such a fixed reflecting body as the ground face GF as well as such an object SO to be sensed as a trespasser, the reflected beams being directed toward a second light receiving means 16.

Figure 5:
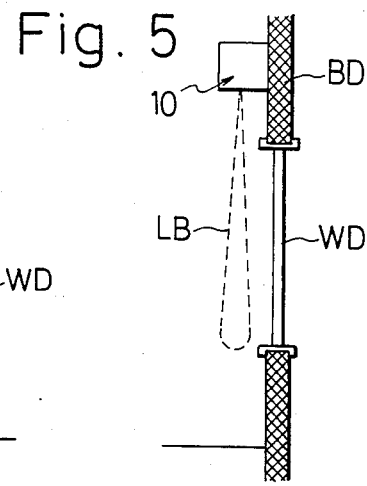
FIG. 5 shows in a side elevation the detection area of FIG. 4.

As the light beam projection is made in the present instance in the mutually different directions on the same plane as emitted through the lens 13 from the light emitting diodes $12_1, \ldots,$ and $12_n$ arranged in an array or, in other words, so as to form a sector shaped plane of the colimated light beams expanding at any desired angle, it is possible that, as shown in FIGS. 4 and 5, the object detecting apparatus 10 of the present invention is installed on a building BD above its window WD so that a light projecting zone having a desired range covering the entire area of the window WD as expanded in parallel thereto.

The first light receiving means 15 includes a condenser lens 17, a photodiode 18 and a mirror 19 for further reflecting the partial light beams LB reflected by the half mirror 14 to guide them through the condenser lens 17 to the photodiode 18. On the other hand, the second light receiving means 16 includes a condensing lens 20 and a photodiode 21 arranged to receive through the lens 20 any light beam incident from the side of the ground face GF. Accordingly, the photodiode 18 in the first light receiving means 15 can receive substantially directly the projected light beams LB without any reflection from the ground face GF or the object SO to be detected, whereas the photodiode 21 in the second light receiving means 16 receives the reflected light beams from the ground face GF or the object SO. Upon receipt of such light beams, the photodiodes 18 and 21 generate electric current signals which are sent to such a projected and received light signal processing means as shown in FIGS. 6A and 6B to determine any phase difference between the both signals, as will be explained next.

Figure 6A:
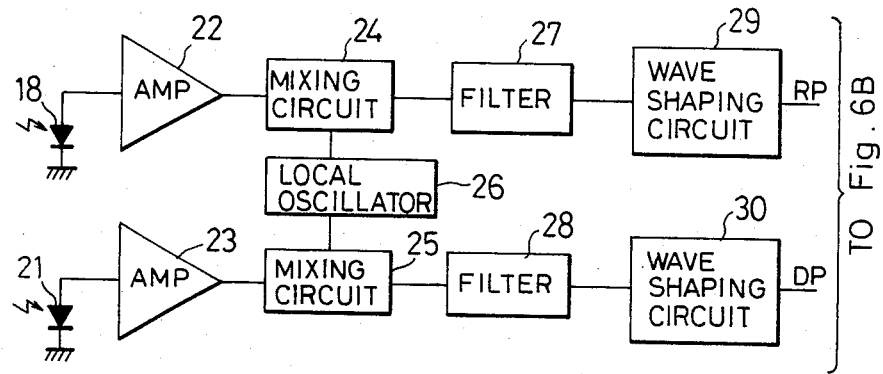
FIGS. 6A and 6B comprise a block diagram of an embodiment of a projected and received light signal processing means in the apparatus according to the present invention.
Figure 6B:
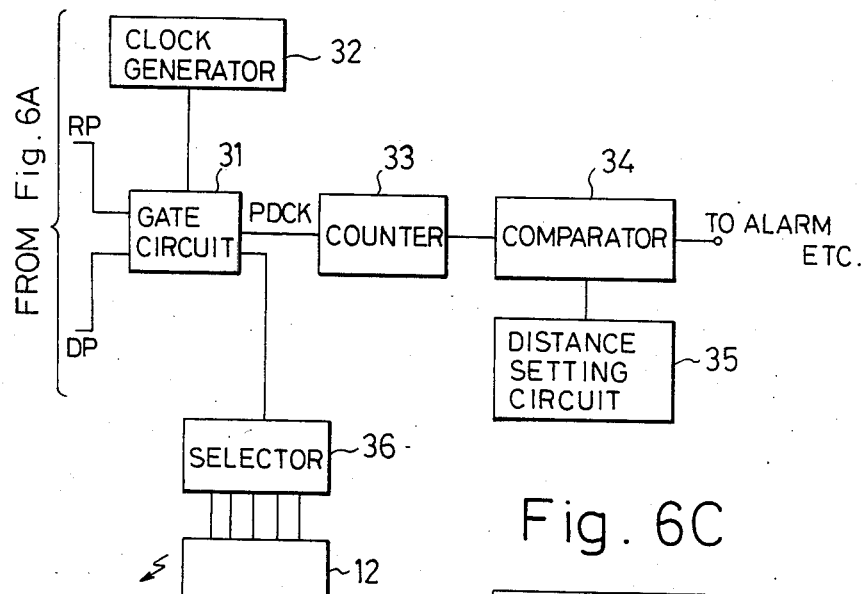
Figure 6C:
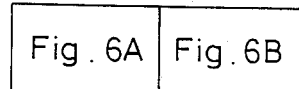
FIG. 6C is an illustration of the relationship between FIGS. 6A and 6B.
Figure 7A:
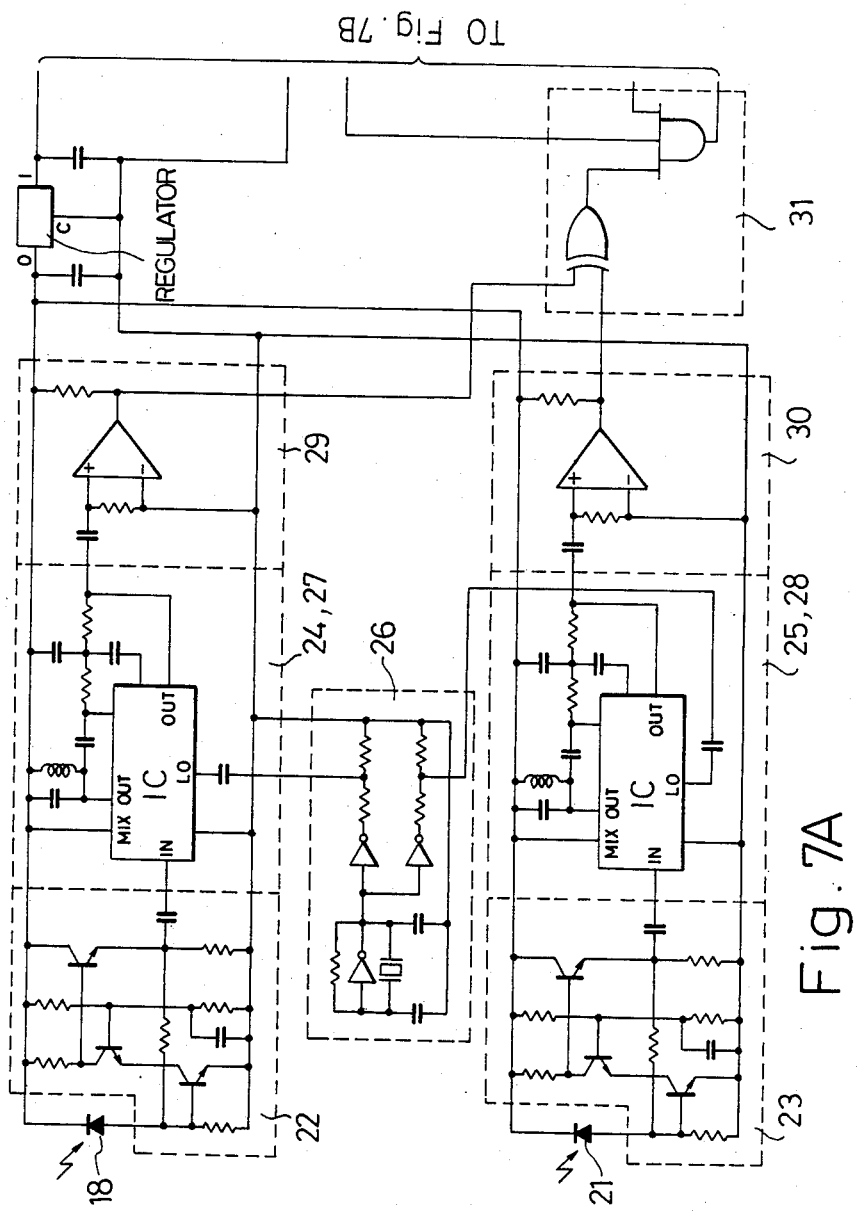

Referring to FIGS. 6A-6C and also to FIGS. 7A-7C showing details of the circuit arrangement of FIGS. 6A-6C, there is shown in the projected and received light signal processing means for the input signals to the first and second light receiving means 15 and 16 resulting from the light beam projection by the projecting means 11. This processing means comprises amplifiers 22 and 23 respectively connected to each of the photodiodes 18 and 21 for amplifying electric currents generated at the photodiodes 18 and 21 with substantially the same amplification factor, mixing circuits 24 and 25 respectively connected to the amplifier 22 or 23 and to a common local oscillator 26 for optimumly frequency-converting the amplified outputs of the amplifiers to corresponding signals in response to input signals from the local oscillator 26, filters 27 and 28 respectively connected to the mixing circuit 24 or 25 for filtering the frequency-converted signals, and wave-shaping circuits 29 and 30 for receiving the filtered signals. Such a rectangular wave RP indicative of a reference phase as shown in FIG. 8(a) is generated by the wave-shaping circuit 29, based on the signal of the photodiode 18 resulting from the directly received light beams without any reflection by the object to be detected or the like, while the other wave shaping circuit 30 generates such a rectangular wave DP indicative of a detection phase as shown in FIG. 8(b) based on the signal of the photodiode 21 resulting from the reflected light beams from the object or the like.

Figure 8:
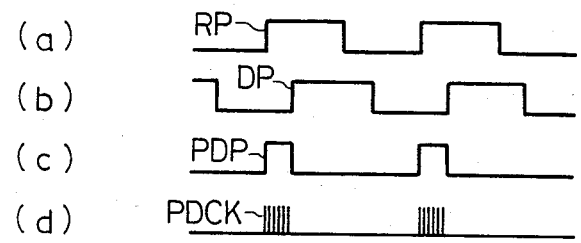
FIGS. 8a-8d show waveforms of signals appearing at a part of the circuit of FIGS. 6A and 6B or FIGS. 7A and 7B.

The reference phase signal RP from the wave shaping circuit 29 and the detection phase signal DP from the other wave shaping circuit 30 are then supplied to a gate circuit 31, in which such a phase difference signal PDP as shown in FIG. 8(c) is generated to have a pulse width from a rise time of the reference phase signal RP to a rise time of the detection phase signal DP. To the gate circuit 31, clock signals are being provided from a clock generator 32 so that such a phase difference clock signal PDCK as shown in FIG. 8(d) will be provided at its output terminal during the pulse width of the phase difference signal PDP of FIG. 8(c). The clock signal PDCK from the gate circuit 31 of which pulse number indicates a phase difference between the reference and detection phase signals is supplied to a counter 33 for counting the pulse number, and an output of the counter is sent to a comparator 34 which also receives an output from a detection distance setting circuit 35 to compare it with the counter output.

When, for example, this counter output corresponding to the phase difference is smaller than the output of the distance setting circuit 35, it indicates that the object SO exists in the detection area and thus the comparator 34 generates an output to operate such an alarm device as a buzzer provided at the subsequent stage. In other words, by setting at the distance setting circuit 35 a value with respect to each of the projected light beams so as to correspond to a distance between the installed position of the object detecting apparatus 10 and an edge portion of the window WD, a detection area of a restricted range can be provided and, only when an object to be detected intrudes into this restricted range, the alarm operation will be effected. The comparator 34 and distance setting circuit 35 may be provided either in separate circuits or, optimumly, in an integral form of a computer CPU as shown in FIG. 7B.

Figure 9:
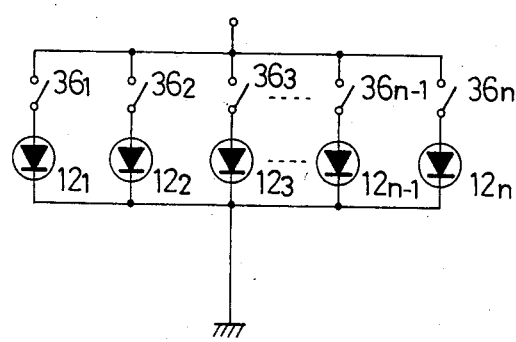
FIG. 9 is a circuit diagram of an embodiment of the scanning means of the apparatus according to the present invention.
Figure 10:
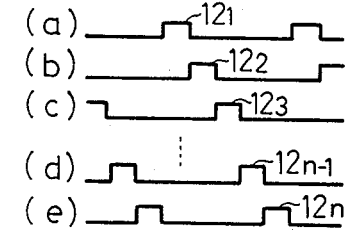
FIGS. 10a-10e and 11a-11e show waveforms of output signals of the scanning means of FIG. 9.

On the other hand, the gate circuit 31 is also connected with a selector 36 which includes, as detailed in FIG. 9, such switching elements $36_1$ to $36_n$ as transistors corresponding in number to the light emitting diodes $12_1$ to $12_n$ of the light projecting array 12. The respective switching elements $36_1$ to $36_n$ are sequentially actuated at optimum time intervals, the gate circuit 31 is opened upon actuation of the respective switching elements $36_1$ to $36_n$ and the light emitting diodes $12_1$ to $12_n$ respectively coupled to each of the switching elements $36_1$ to $36_n$ are thereby caused to turn ON sequentially as shown in FIG. 10. In other words, a plurality of the light beams are emitted sequentially from the projecting array 12 according to the present invention, respectively forming an angle with adjacent one of them as passed through the collimater lens 13 and half mirror 14 along the single plane, so that the sequentially projected light beams will form as a whole a planar detection area having a certain expansion. Since the phase difference is calculated for each of the light emitting diodes $12_1$ to $12_n$ and the detection distance for each light beam is restricted on the basis of the setting values at the distance setting circuit 35 as in the foregoing, the detection area restricted to a range just covering the window WD as shown in FIGS. 4 and 5 can be realized. When the light projecting array 12 is driven on a so-called scanning basis, the light emitting diodes $12_1$ to $12_n$ will be turned ON respectively separately for only a short time, so that the power consumption necessary for actuating these diodes can be remarkably reduced, the durability of the diodes can be remarkably improved, detecting operation can be realized in a very short time, and inexpensive diodes can be effectively utilized.

Figure 11:
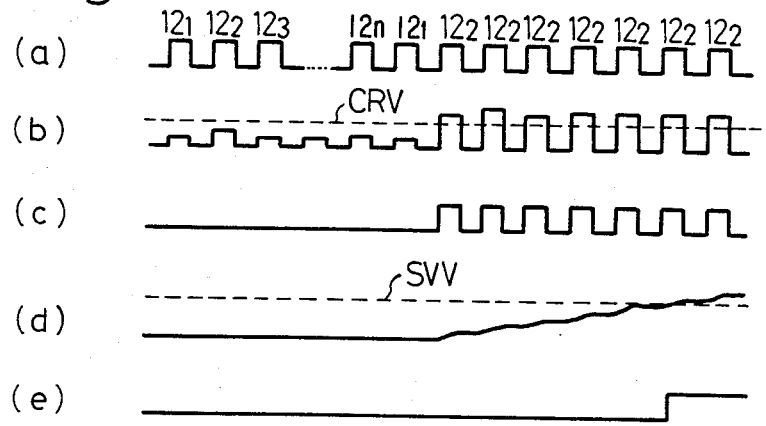

When it is detected with the foregoing arrangement and during the actuation of one of the light emitting diodes that an object has entered the detection area, the particular diode alone can be continuously turned ON. More particularly, the arrangement is made so that, in the case where, for example, only the light emitting diode $12_2$ within the respective diodes $12_1$ to $12_n$ has detected a presence of the object in one scanning cycle for all of the diodes, the input to the comparator 34 exceeds a reference output voltage CRV set in the comparator as shown in FIG. 11(b), upon which a signal for causing the diode $12_2$ only to be continuously actuated is fed to the selector 36 which providing the scanning outputs to the light projecting array 12, whereby the selector is caused to stop the scanning cycle for all the light emitting diodes $12_1$–$12_n$ but to keep only the particular diode $12_2$ to be actuated as shown in FIG. 11(a). In this case, the alarm means connected to the comparator receives continuously such outputs from the comparator as shown in FIG. 11(c), in response to which the alarm means is operatively coupled to a gradually integrating means so that, when the integrated value in this means exceeds a threshold voltage SVV, the alarm means will perform its alarm operation as shown in FIG. 11(e). Such arrangement enables a positive prevention of malfunction of the alarm means caused due especially to such transitory intruding object as a small flying or moving animal which enters but quickly leaves the detection area. In other words, it is possible to effectively detect only such an object which remains present within the detection area as a trespasser trying to break or open the window WD of FIGS. 4 and 5 to intrude into the building. It will be easily appreciated that, when a person who enters the detection area for installation, maintenance or the like purpose or by error immediately leaves the area, the alarm means can be similarly prevented from being actuated.

Figure 12:
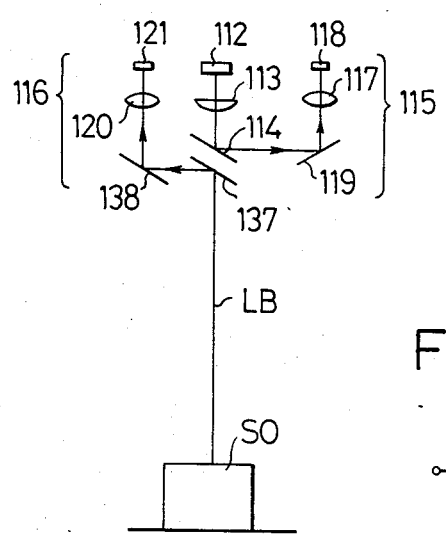
FIG. 12 shows schematically in a side elevation similar to FIG. 2 a relationship between the light projecting and receiving means in another embodiment of the apparatus according to the present invention.
Figure 14:
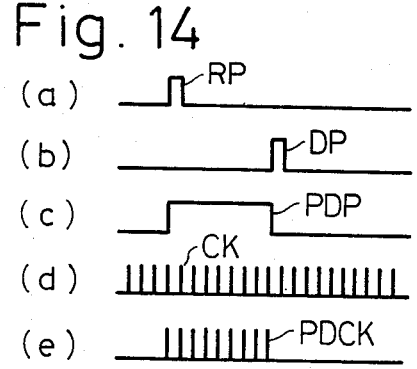
FIGS. 14a-14e show waveforms of output signals appearing at various points in the circuit of FIG. 13.
Figure 13:
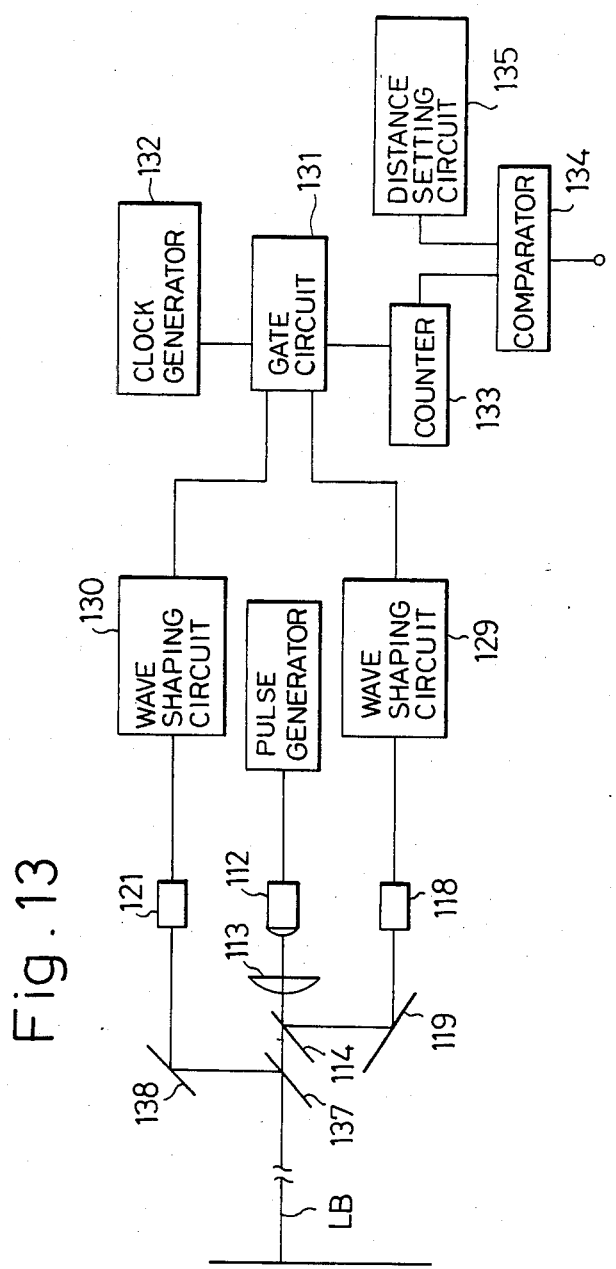
FIG. 13 is a block diagram of another embodiment of the projected and received light signal processing means used in the embodiment of FIG. 12.

In FIG. 12, there is shown another embodiment adapted to detect a time difference instead of the phase difference, in which a second light receiving means 116 includes a second half mirror 137 and a second mirror 138, while a first light receiving means 115 is similar to that of the embodiment of FIGS. 1 and 2, and the second light receiving means 116 is provided to receive the light beams LB which are passed through the first and second half mirrors 114 and 137 and reflected back from the stationary reflecting body or any object to be detected to the second half mirror 137 and then to the mirror 138, such beams being directed through a condensing lens 120 to a photodiode 121. Reference signal for the projected light beams and detection signal for the received light beams due to the light incision on the photodiodes 118 and 121 are processed by such a projection and reception signal processing means as shown in FIG. 13, in which such time difference signal PDP as in FIG. 14(c) between the reference signal RP of FIG. 14(a) and the detection signal DP of FIG. 14(b) is obtained, and such a time difference clock signal PDCK as shown in FIG. 14(e) is provided to a counter 133 from a gate circuit 131 receiving such a clock signal CK as in FIG. 14(d).

For the scanning operation of a light projecting array 112, a clock generator may be utilized together with the selector as partly shown in FIG. 7B, so that respective light emitting diodes of the array 112 will be turned ON in synchronism with the clock pulse generated by the clock generator. Other arrangements are similar to those of the foregoing embodiments. In FIGS. 12 and 13, the same constituent elements as those of the foregoing embodiments in FIGS. 1 and 2 and FIGS. 6A and 6B and FIGS. 7A and 7B are denoted by the same reference numerals but added by 100. In addition, since the distance restriction is effected on the basis of the phase difference or time difference between the reference and detection phase signals in both of the foregoing embodiments, it is possible to remove such a risk that, as in the case of the conventional system for determining the distance on the basis of the amount of reflected light, an object actually at a relatively long distance is erroneously judged as if the same is at a relatively short distance specifically when the object shows a high reflection factor.

Figure 15:
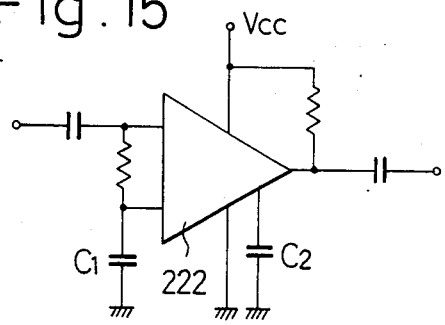
FIG. 15 is a circuit diagram of another embodiment of an amplifier in the circuit of FIGS. 6A and 6B or FIGS. 7A and 7B.

In the present invention, further, various design modification can be made. For example, the reference phase signal has been referred to as being obtained through the mirror and condensing lens in the above embodiments, but the light beams projected from the light emission diodes may be partly branched into an optical fiber coupled directly to the photodiode of the first light receiving means. Further, while the light emitting diodes of the light projecting array has been disclosed to be individually separately scanned, the diodes may be divided into groups so that two or more diodes forming each group will be simultaneously actuated, in which event the projected light beam upon each light projection of the array can be made wider so as to further shorten the time required for each scanning cycle. In the projected and received light signal processing circuit of FIGS. 6A and 6B or 7A and 7B, on the other hand, the received light signals are continuously applied through the first and second light receiving means to the amplifiers according to the scanning cycle, but this arrangement involves a risk of erroneous distance judgement due to that the bias of the amplifiers tends to vary with time to cause their amplification degree to be varied so that, in the event of an increased amplification degree of the both amplifiers, the output waveform distortion of the amplifiers is also caused to vary with time, whereby the outputs of the wave shaping circuits responsive to such outputs are made to change their duty ratio to render the phase difference no more correspond to its actual value. This risk may be avoided when, as shown in FIG. 15, capacitors $C_1$ and $C_2$ having relatively large capacities are connected to an amplifier 222 having a bias resistance therein and a time constant determined by the bias resistance and capacitors $C_1$ and $C_2$ is set to be sufficiently larger than the light emitting period as activated with the burst waves from the light emitting diodes, so that any variation in the bias value of the amplifiers can be made negligibly small, the value will be substantially constant, and the phase difference can be made to correspond to the actual value.

Further, the computer CPU shown in FIG. 7 may be provided with a function of calculating an average value of the reference and detection phase differences at intervals of, for example, N scanning cycles, so as to realize the distance judgement on the subsequent phase difference as based on the average value as a reference. Usually, the received light signals resulting from the light beams reflected from the same ground face GF tend to vary and, when the distance restriction is performed depending on the set value of the detection distance setting circuit as based on the first obtained detection value of one of the light emitting diodes as a reference, the determined distance will also be subjected to a variation. When such average value as above is utilized as a reference and the value is renewed at the intervals of N scanning cycles, however, a highly accurate distance restriction can be realized.

Figure 16:
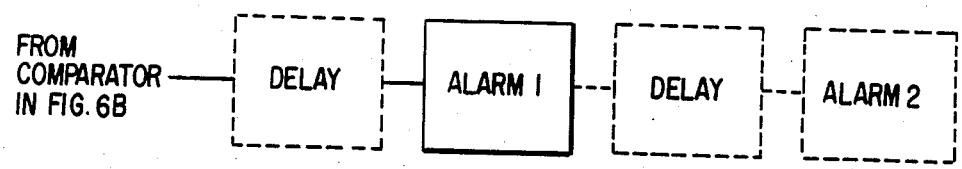
FIG. 16 is a block diagram of alarm means useable with the processing means of FIGS. 6A and 6B.

Furthermore, a delay circuit may be inserted between the alarm means and the comparator receiving the reference and detection phase difference signal, so that the delay circuit will provide a time lag to the timing of the comparator output supply to the alarm means this delay circuit is shown in dashed contour as optional, and designated by reference numeral 140 in FIG. 16. In the absence of such a delay circuit, the alarm means operates substantially instantaneously upon a presence of intruder in the detection area so that he may easily recognize the extent of the set detection area, but this risk can be removed by the time lag provided by the delay circuit to the operation of the alarm means. That is, the alarm means may be made not to operate immediately upon transitory insertion of the intruder's hand or the like into the set detection area but to operate after its removal from the area. When a second alarm means is provided as installed at an associated security service or the like in addition to the first alarm means, shown in dashed contour as optional, and designated by reference numeral 144 in FIG. 16, it is also useful to insert a delay circuit between the first and second alarm means this delay circuit is shown in dashed contour as optional, and designated by reference numeral 142 in FIG. 16. It is also possible in this case that, when an installing engineer or the like person mistakingly enters the detection area and the first alarm means has been thereby operated, the operation of the second alarm means can be avoided so long as he quickly gets out of the detection area.

In addition, such light emitting elements that can emit visible lights may be additionally provided in the light projecting array, for use only upon installation of the object detecting apparatus, so that he may be able to check the location of the intended detection area with the visible lights.

What is claimed as our invention is:

1. An object detecting apparatus for a restricted detection area, comprising a plurality of light projecting means arranged in a row to be independently actuated to project a row of light beams, scanning means for sequential actuation of said light projecting means, first means for receiving said light beams directly from the respective light projecting means without reflection from an object external to said apparatus, second means for receiving the light beams projected by the light projecting means after being reflected by a reflecting object, means for receiving an output of said first light receiving means to provide a reference phase for the light beams projected, means for receiving an output of said second light receiving means to provide a detection phase of the light beams reflected and received, means for determining a phase difference between said reference and detection phases, an alarm means operated by an output provided by said phase difference determining means, means for storing indications representative of a predetermined range of said restricted detection area within which said device is operative, and output inhibiting means responsive to said stored indications and output of said phase difference determining means for inhibiting said output to said alarm means when said phase difference is of a level not within said predetermined range.

2. An object detecting apparatus according to claim 1, wherein said light projection means are light emitting elements actuatable with a low current and arranged in a light projecting array, each of said light beams being projected from said light projecting array at an incremental angle to adjacent beams, and in a single plane.

3. An object detecting apparatus according to claim 2, which further comprises means responsive to receipt of said reflected light beams for continuously actuating only those light emitting elements corresponding to said reflected light beams received.

4. An object detecting apparatus according to claim 1, wherein said phase difference determining means comprises a comparator which receives said output of said reference phase means and said detection phase means, and the apparatus further comprises a detection distance setting circuit connected to said comparator to provide thereto a predetermined set value.

5. An object detecting apparatus according to claim 1, which further comprises means connected to said phase difference determining means for obtaining an average value of said phase difference at intervals of N scanning cycles of said light projecting means by said scanning means, said average value being used for determining subsequent ones of the phase differences.

6. An object detecting apparatus according to claim 1, which further comprises delay means inserted between said phase difference determining means and said alarm means for delaying said output of the phase difference determining means.

7. An object detecting apparatus according to claim 1, wherein said alarm means comprises first and second alarm means which are operated sequentially, and a delay means inserted between said first and second alarm means.

8. An object detecting apparatus according to claim 1, wherein said plurality of light projecting means partly comprises visible light emitting elements for use upon installation of said apparatus.

* * * * *